United States Patent
Joshi et al.

(10) Patent No.: US 9,840,931 B2
(45) Date of Patent: Dec. 12, 2017

(54) AXIAL RETENTION OF A PLATFORM SEAL

(71) Applicant: ANSALDO ENERGIA IP UK LIMITED, London (GB)

(72) Inventors: Gaurav K. Joshi, Palm Beach Gardens, FL (US); John Cuyler Hunt, Jupiter, FL (US); Orestes J. Maurell, West Palm Beach, FL (US); Adam L. Hart, Stuart, FL (US)

(73) Assignee: ANSALDO ENERGIA IP UK LIMITED (GB)

( * ) Notice: Subject to any disclaimer, the term of this patent is extended or adjusted under 35 U.S.C. 154(b) by 694 days.

(21) Appl. No.: 14/040,813

(22) Filed: Sep. 30, 2013

(65) Prior Publication Data

US 2014/0030100 A1 Jan. 30, 2014

(51) Int. Cl.
| | | |
|---|---|---|
| *F01D 11/00* | (2006.01) | |
| *F01D 5/30* | (2006.01) | |
| *F16J 15/06* | (2006.01) | |
| *F16J 15/08* | (2006.01) | |
| *F01D 5/22* | (2006.01) | |

(52) U.S. Cl.
CPC .............. *F01D 11/006* (2013.01); *F01D 5/22* (2013.01); *F01D 5/3007* (2013.01); *F16J 15/061* (2013.01); *F16J 15/0887* (2013.01); *F05D 2240/80* (2013.01); *F05D 2260/941* (2013.01); *Y10T 29/49719* (2015.01)

(58) Field of Classification Search
CPC .. F01D 11/006; F01D 5/3007; F05D 2240/80; F05D 2260/941; F16J 15/0087; F16J 15/061; Y10T 29/49719

USPC ................... 416/219 R, 221, 220 R
See application file for complete search history.

(56) References Cited

U.S. PATENT DOCUMENTS

| | | | | | |
|---|---|---|---|---|---|
| 2,912,223 | A | * | 11/1959 | Hull, Jr. ................. | F01D 5/22 416/221 |
| 3,077,811 | A | * | 2/1963 | Moore .................. | F01D 5/3007 220/320 |
| 4,062,638 | A | * | 12/1977 | Hall, Jr. ................ | F01D 11/006 416/193 A |
| 4,189,282 | A | * | 2/1980 | Benoist ................. | F01D 5/3015 416/193 A |
| 4,365,933 | A | * | 12/1982 | Langer .................. | F01D 9/041 415/200 |
| 4,480,958 | A | * | 11/1984 | Schlechtweg ........ | F01D 11/006 416/219 R |
| 4,502,809 | A | * | 3/1985 | Geary .................... | F01D 25/26 403/28 |
| 4,936,749 | A | * | 6/1990 | Arrao ..................... | F01D 5/22 416/190 |
| 5,746,578 | A | * | 5/1998 | Brassfield ............. | F01D 5/26 416/190 |

(Continued)

*Primary Examiner* — Craig Kim
*Assistant Examiner* — Wayne A Lambert
(74) *Attorney, Agent, or Firm* — Hovey Williams LLP; Peter Knops (57) ABSTRACT

A gas turbine engine component has an axial seal pin assembly for sealing between adjacent platform regions where the seal pin assembly design provides a seal pin damper slot extending to a forward axial stop in a forward buttress region. The forward axial stop includes a relief slot to interrupt the loadpath from the airfoil into the blade neck and attachment regions to reduce the stress concentrations in these regions.

20 Claims, 12 Drawing Sheets

(56) References Cited

U.S. PATENT DOCUMENTS

| | | | | |
|---|---|---|---|---|
| 6,086,329 A * | 7/2000 | Tomita | F01D 11/006 | 277/634 |
| 6,183,202 B1 * | 2/2001 | Ganshaw | F01D 5/3007 | 416/219 R |
| 6,273,683 B1 * | 8/2001 | Zagar | F01D 5/22 | 277/421 |
| 6,354,803 B1 * | 3/2002 | Grover | F01D 5/26 | 29/889.21 |
| 6,390,775 B1 * | 5/2002 | Paz | F01D 5/14 | 416/193 A |
| 6,761,536 B1 * | 7/2004 | Bash | F01D 5/18 | 416/193 A |
| 6,851,932 B2 * | 2/2005 | Lagrange | F01D 5/22 | 416/190 |
| 6,896,483 B2 * | 5/2005 | Dierksmeier | F01D 11/18 | 403/28 |
| 6,951,447 B2 * | 10/2005 | Cherolis | F01D 5/141 | 416/193 A |
| 7,229,245 B2 * | 6/2007 | Ellis | F01D 9/041 | 415/135 |
| 7,367,123 B2 * | 5/2008 | Itzel | F01D 5/22 | 29/889.2 |
| 7,399,163 B2 * | 7/2008 | Bil | F01D 5/147 | 416/193 A |
| 7,458,779 B2 * | 12/2008 | Bil | F01D 5/147 | 416/190 |
| 7,762,780 B2 * | 7/2010 | Decardenas | F01D 5/147 | 416/193 A |
| 8,393,869 B2 | 3/2013 | Kim et al. | | |
| 2005/0106028 A1 * | 5/2005 | Ahmad | F01D 5/147 | 416/228 |
| 2007/0031259 A1 * | 2/2007 | Dube | F01D 5/147 | 416/193 A |
| 2007/0128041 A1 * | 6/2007 | Ahmad | B23P 6/045 | 416/231 R |
| 2007/0269313 A1 * | 11/2007 | Nadvit | F01D 5/18 | 416/193 A |
| 2009/0142195 A1 | 6/2009 | Brittingham et al. | | |
| 2010/0111700 A1 | 5/2010 | Kim et al. | | |

* cited by examiner

AXIAL RETENTION OF A PLATFORM SEAL

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to gas turbine engines. More particularly, embodiments of the present invention relate to an apparatus and method for an axial pin seal assembly for use with a turbine blade.

BACKGROUND OF THE INVENTION

Gas turbine engines operate to produce mechanical work or thrust. Specifically, land-based gas turbine engines typically have a generator coupled thereto for the purposes of generating electricity. A gas turbine engine comprises an inlet that directs air to a compressor section, which has stages of rotating compressor blades. As the air passes through the compressor, the pressure of the air increases. The compressed air is then directed into one or more combustors where fuel is injected into the compressed air and the mixture is ignited. The hot combustion gases are then directed from the combustion section to a turbine section by a transition duct. The hot combustion gases cause the stages of the turbine to rotate, which in turn, causes the compressor to rotate.

Figure 1:
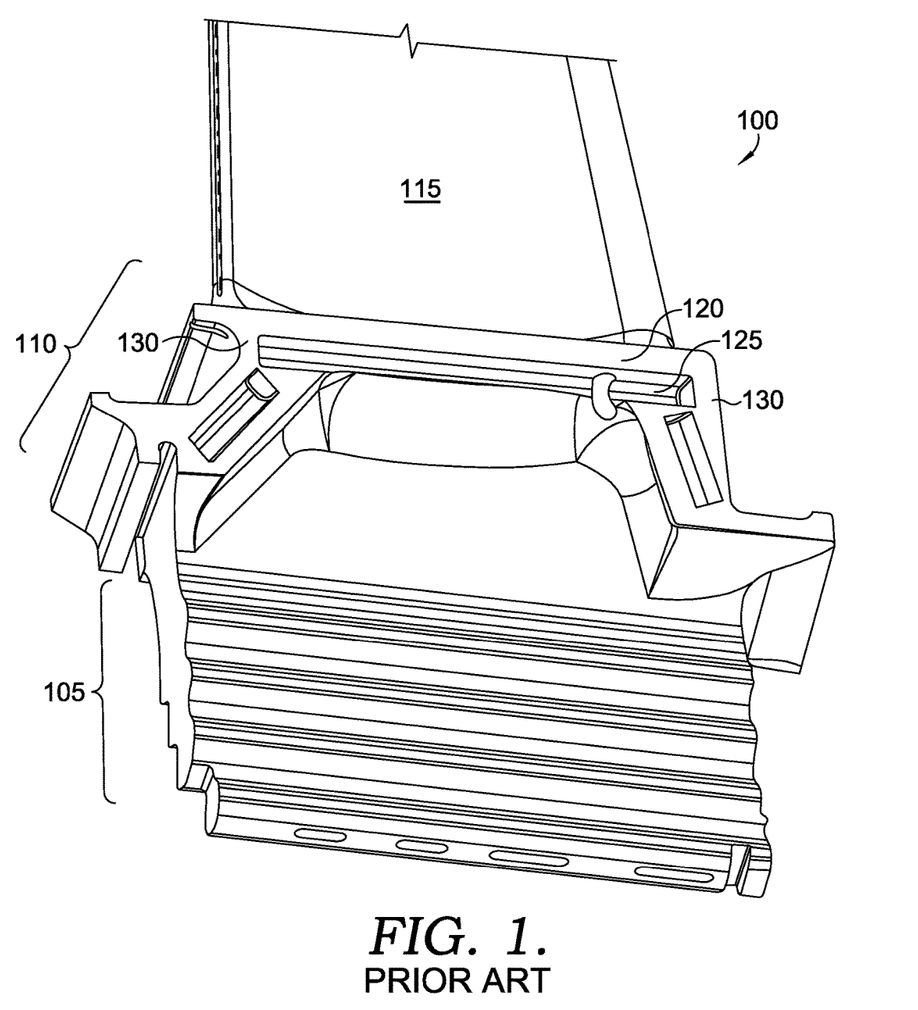
FIG. 1 is a perspective view of a portion of a gas turbine blade comprising an encapsulated axial seal pin damper slot of the prior art.
Figure 2:
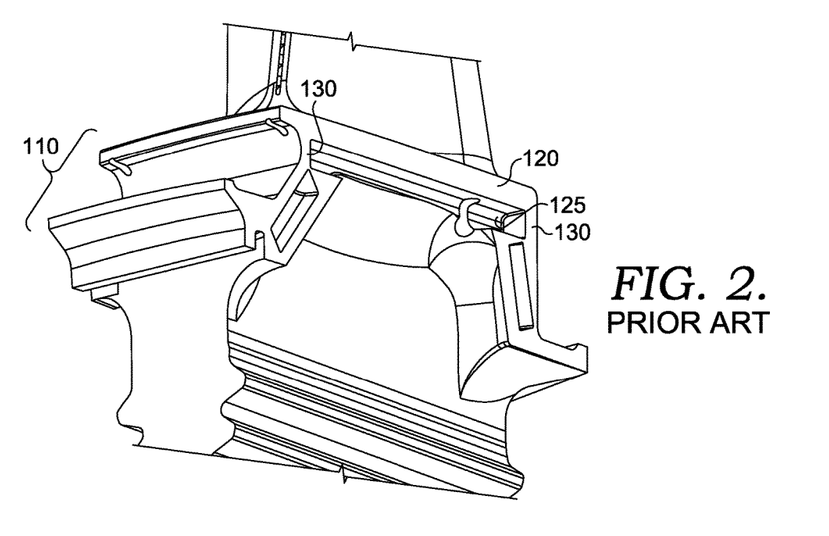
FIG. 2 is an alternate perspective view of a portion of a gas turbine blade comprising an encapsulated axial seal pin damper slot of the prior art.

Referring initially to FIGS. 1 and 2, a portion of a gas turbine blade 100 in accordance with the prior art is shown. The gas turbine blade 100 comprises an attachment 105, a root 110 and an airfoil 115. The root 110 of the gas turbine blade 100 comprises a seal pin damper slot 125 encapsulated by a platform 120 and buttresses 130. The buttresses 130 at the leading edge and trailing edge of the encapsulated seal pin damper slot 125 are part of a buttress 130 continuously connected to the platform 120 and root 110.

When a gas turbine blade 100 is in use, there is a significant temperature difference between the platform 120 and the buttress 130. Due to the continuous connection between the platform 120 and the buttress 130 as shown in the prior art, there is a high concentration of stress at the platform cooling slots due to the significant temperature difference between the platform 120 and the buttress 130. These high stresses can cause cracking around the connection between the platform 120 and the buttress 130.

BRIEF SUMMARY OF THE INVENTION

In accordance with the present invention, there is provided a novel configuration for a gas turbine engine component having a seal pin damper slot with an axial pin stop assembly. The axial pin stop assembly allows the seal pin damper slot to be extended to the leading edge of the buttress, an improvement that further enhances a temperature buffer between a buttress and a platform while reducing stress levels in the gas turbine blade.

In an embodiment of the present invention, an axial pin seal assembly comprises a generally axially extending seal pin damper slot extending to a forward face of a buttress of the turbine blade. A generally radially extending pin stop slot in the buttress intersects the seal pin damper slot. A generally cylindrical seal pin is placed within the seal pin damper slot and an axial pin stop is secured within the pin stop slot, wherein the axial pin stop limits axial movement of the seal pin. The seal pin is flush with a platform mateface surface. The pin seals a leak that is opened up when the seal slot is opened through the leading edge of the buttress surface.

In an alternative embodiment, a gas turbine blade incorporating an improved sealing surface is disclosed. The turbine blade comprises an attachment and with a neck portion extending radially outward from the attachment and having one or more buttresses. A platform portion extends radially outward from the neck with a seal pin damper slot extending along a sideface of the platform to a leading edge of the buttress. A generally radially extending pin stop slot in the buttress intersects the seal pin damper slot. A generally cylindrical seal pin is located within the seal pin damper slot, and an axial pin stop is fixed within the pin stop slot.

In yet another embodiment, a method for sealing gaps between adjacent turbine blades in a gas turbine engine is disclosed. The method comprises undercutting a portion of a buttress proximate the leading edge of the turbine blade. The method also comprises placing a generally axially extending seal pin damper slot in a buttress and platform region of the turbine blade, wherein the slot extends to a forward face of the turbine blade. The method further comprises placing a generally radially extending pin stop slot in the buttress such that the pin stop slot intersects with a seal pin damper slot. The method further comprises securing an axial pin stop within the pin stop slot and placing a generally cylindrical seal pin within the seal pin damper slot. It should be noted that the steps in the method need not be performed in the order disclosed, but may also be performed in any allowable permutation of the disclosed steps.

In yet another alternate embodiment of the present invention, a seal pin damper slot is positioned in the turbine blade while providing a break in the loadpath of stress passing from the airfoil to a root portion of the blade. The seal pin damper slot is formed along a portion of the platform and forward and aft buttresses with a relief slot then placed in the remaining forward axial stop region.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Referring to FIGS. 3-7, a gas turbine blade 300 is shown according to an embodiment of the present invention. A gas turbine blade 300 includes an attachment 305; a neck portion 310 extending radially outward from the attachment 305 and having one or more buttresses 330. A platform portion 320 extends radially outward from the neck 310 and has a seal pin damper slot 325 extending along a sideface of the platform 320, with the slot 325 extending to a leading edge of the buttress 330. A generally radially extending pin stop slot 335 is locked in the buttress 330 and intersects the seal pin damper slot 325 while a generally cylindrical seal pin 345 is located within the seal pin damper slot 325 and, an axial pin stop 340 fixed within the pin stop slot 335.

Figure 3:
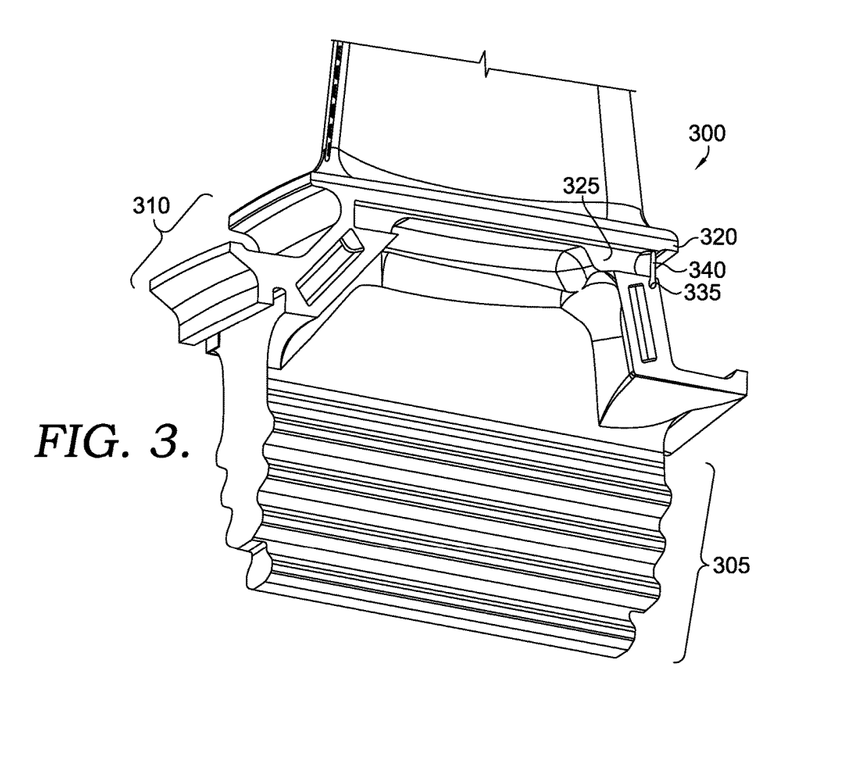
FIG. 3 is a perspective view of a portion of a gas turbine blade in accordance with an embodiment of the present invention.
Figure 4:
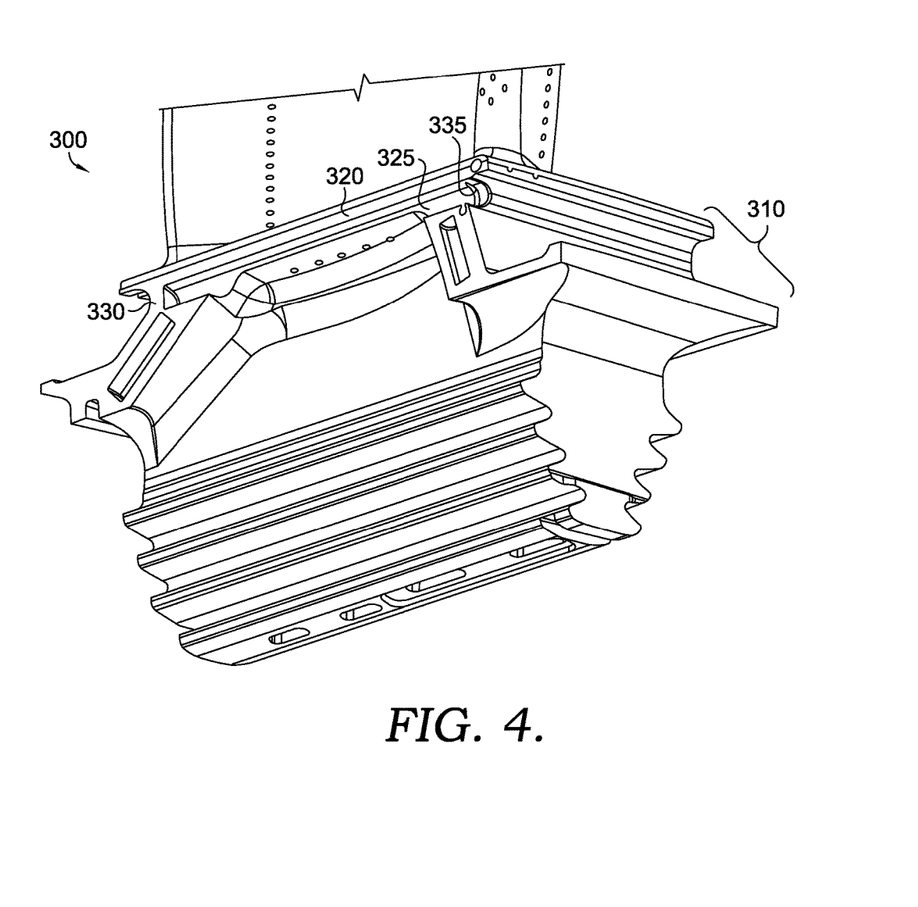
FIG. 4 is an alternative perspective view of a portion of a gas turbine blade in accordance with an embodiment of the present invention.
Figure 5:
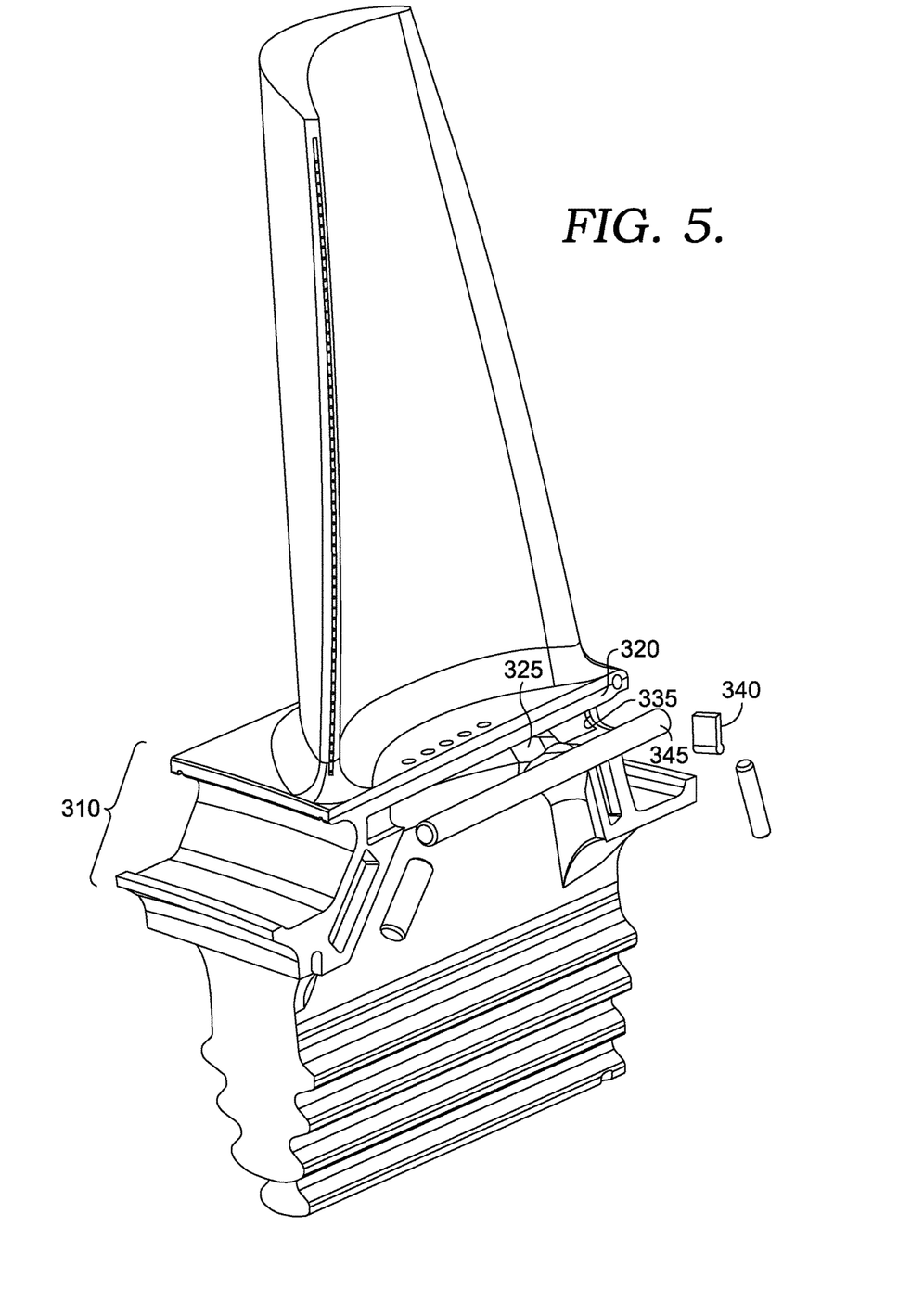
FIG. 5 is an exploded view of a gas turbine blade in accordance with an embodiment of the present invention.
Figure 6:
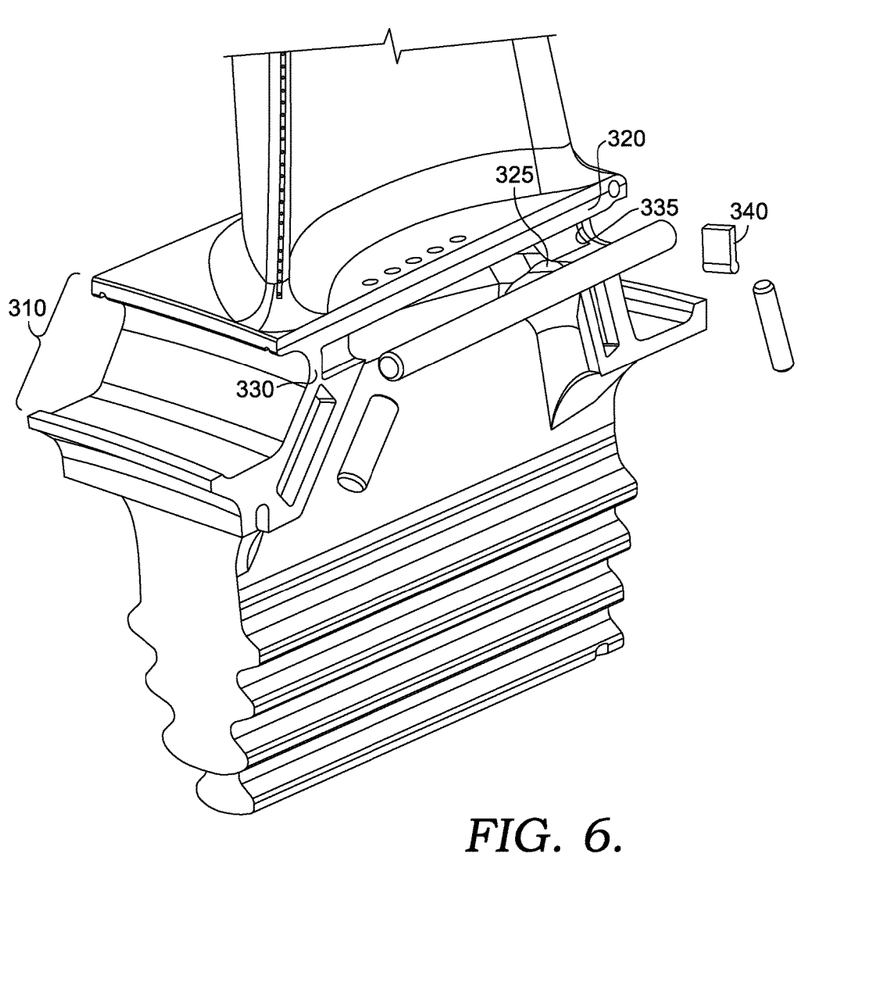
FIG. 6 is a detailed exploded perspective view of a portion of a gas turbine blade in accordance with an embodiment of the present invention; and, FIG. 7 is another detailed perspective view of a portion of a gas turbine blade in accordance with an embodiment of the present invention.
Figure 7:
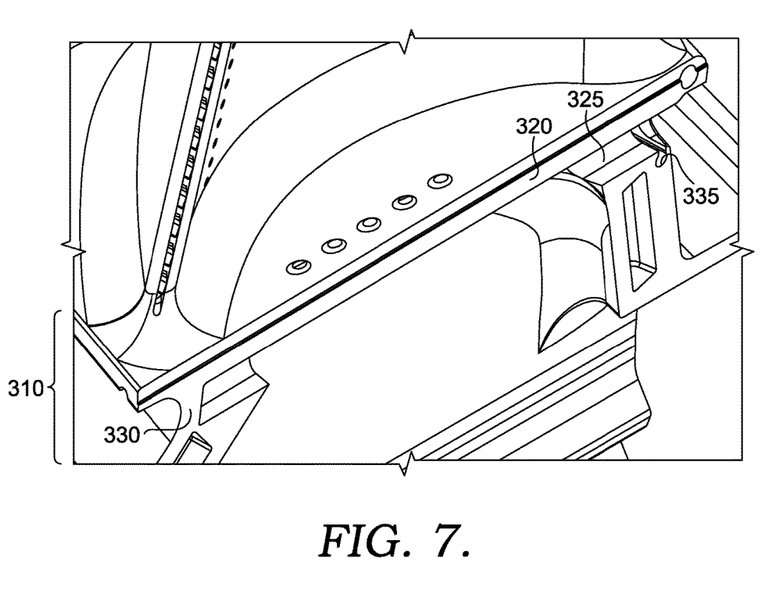

In an effort to reduce the effect of the thermal gradient between the platform 320 and the buttress 330, the gas turbine blade 300 as seen in FIG. 3 comprises an axial seal pin damper slot 325 to effectively separate the platform 320 from the buttress 330. In the gas turbine blade 300, the buttress 330 may be modified by undercutting material from the leading edge of the turbine blade. In another embodiment, the buttress 330 may be undercut along the pressure side of the turbine blade. In an alternative embodiment, the buttress 330 may be undercut along the pressure side of the turbine blade and along the leading edge of the turbine blade, wherein the two undercuts may intersect. Undercutting material from the buttress 330 reduces the amount of cold buttress material coming in direct contact with the platform 320, effectively decoupling the platform 320 from the buttress 330. With the platform 320 decoupled from the buttress 330, the shank of the blade is isolated from the platform 320.

Material may also be removed from a portion of the buttress 330 to form an axial damper slot 325 that extends to the leading edge of the buttress 330. This increases the slot size as a means of decoupling the platform 320 from the buttress 330. In an alternative embodiment, the axial seal pin damper slot 325 may also or alternatively be extended towards the trailing edge as a means of decreasing the temperature gradient between the platform 320 and the buttress 330.

In an alternative embodiment, the axial seal pin damper slot 325 may extend along a majority of an axial length of the platform 320. The axial seal pin damper slot 325 may also be generally perpendicular to the axial pin stop slot 335. While the axial pin stop 340 limits the movement of the seal pin 345 to the length of the seal pin damper slot 325, the seal pin 345 may continue to move axially between an end of the seal pin damper slot 325 and the axial pin stop 340.

The invention further comprises an axial pin seal assembly to keep the seal pin 345 within the seal pin damper slot 325. An axial pin seal assembly for use with a gas turbine blade 300 is disclosed, comprising a generally axially extending seal pin damper slot 325 extending to a forward face of a buttress 330 of the gas turbine blade 300 and a generally radially extending pin stop slot 335 in the buttress 330 that intersects with the seal pin damper slot 325. A generally cylindrical seal pin 345 is placed within the seal pin damper slot 325 and an axial pin stop 340 is secured within the pin stop slot 335 such that the axial pin stop 340 limits axial movement of the seal pin 345.

The axial pin stop assembly prevents the seal pin 345 exiting the seal pin damper slot 325 at the forward end of the slot. To do this, the axial pin stop 340 may be permanently affixed into the pin stop slot 335. In one embodiment of the present invention, the axial pin stop 340 is brazed into the pin stop slot 335. The axial pin stop 340 may also be removably affixed into the axial pin stop slot 335. The axial pin stop 340 may alternatively be retained by an adjacent blade. The axial pin stop 340 may alternatively be welded into place. In another alternative, the axial pin stop 340 may be fit with an interference fit.

In another embodiment, the axial pin stop 340 partially blocks the seal pin damper slot 325. The axial pin stop slot 335 may also intersect completely with the seal pin damper slot 325 and slide into a portion of the platform 320.

In addition to working as a seal, the axial pin stop 340 may also work as a means to keep a seal pin 345 in place, the axial pin stop 340 may also work as an air seal by completely blocking air from exiting the seal pin damper slot 325 towards the leading edge of the blade 300. The axial pin stop 340 may also work to reduce leakage of cooling flow passing through the seal pin damper slot 325. In either case, the axial pin stop 340 may extend into the platform 320. The axial pin stop 340 and axial pin stop slot 335 may also include a radial retention component to aid in keeping the axial pin stop 340 in the axial pin stop slot 335.

The present invention also provides a method of sealing gaps between adjacent platforms through undercutting a portion of a buttress proximate the blade leading edge and placing a generally axially extending seal pin damper slot in a buttress and platform region of the turbine blade. Undercutting portions of the buttress for stress reduction create leakage areas that must be sealed. The slot created preferably extends to a forward face of the turbine blade and by placing a generally radially extending pin stop slot in the buttress such that the pin stop slot intersects with a seal pin damper slot an axial pin stop can be secured within the pin stop slot. This ensures that a generally cylindrical seal pin remains within the seal pin damper slot.

In an embodiment of the present invention, the seal pin damper slot 325 may be machined into a turbine blade. The seal pin damper slot 325 may also or alternatively be cast into a turbine blade. In a similar manner, the axial pin stop slot 335 may be machined into or cast into cast turbine blade. When forming an axial pin stop slot 335, the axial pin stop slot 335 is flush with the mateface of the buttress 330/ platform 320. In this way, the addition of an axial pin stop slot 335 does not interface with adjacent turbine blades 300 in the assembly of a turbine rotor.

Referring now to FIGS. 8-13, alternate embodiments of the present invention are shown in detail. In these alternate embodiments, the benefits of securing a generally cylindrical seal pin between adjacent turbine blades for purposes of sealing the platform gap therebetween can be achieved through an alternate structural configuration and process. That is, in the embodiments discussed above, an axial pin stop is placed in and secured within the seal pin damper slot and as such, the axial pin stop serves to provide limits to the amount of axial movement by the generally cylindrical seal pin. However, ability to easily manufacture this configuration has been limited. For example, in one embodiment discussed above, an axial pin stop is brazed into the pin stop slot and as the turbine blade undergoes a post-coating diffusion heat treat cycle, some of the braze material used to secure the axial pin stop in the axial pin stop slot has been known to re-liquefy and run into the seal pin damper slot, where it then solidifies. As a result, the braze material that seeps into the seal pin damper slot must be removed by a subsequent re-machining of the slot or hand blending. This results in both a financial and time cost to the manufacturer due to the manpower and effort required to remove the excess braze material in the seal pin damper slot. Furthermore, the joint between the axial pin stop and the platform/ buttress region is weakened due to less braze material securing the axial pin stop to the seal pin damper slot.

Figure 8:
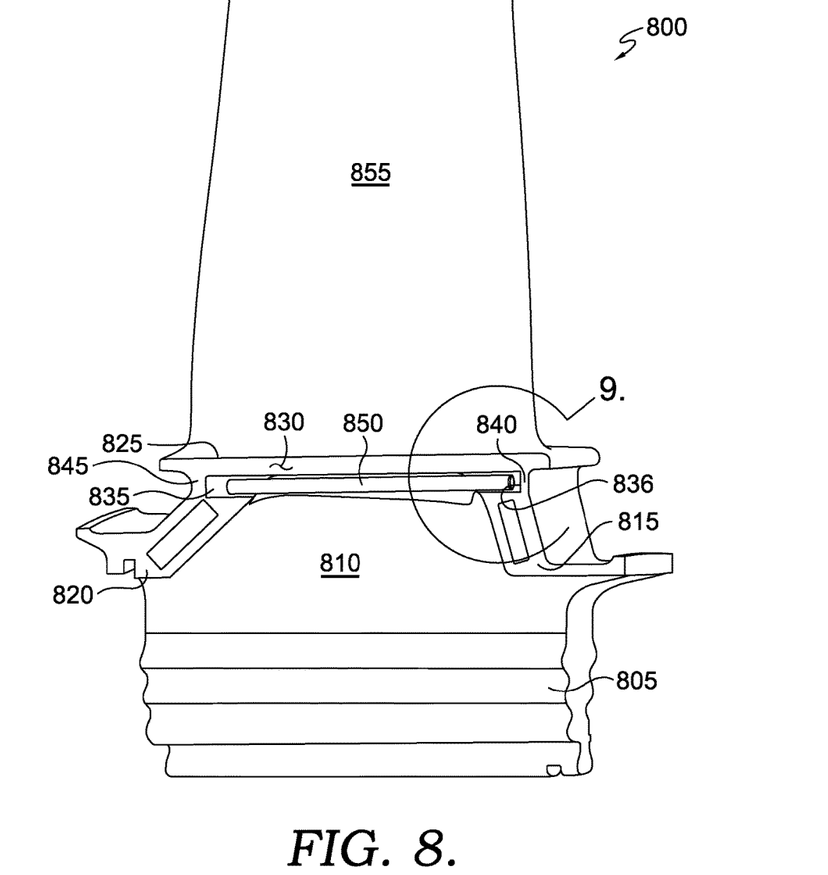
FIG. 8 is an elevation view of a gas turbine blade incorporating the relief slot in accordance with an alternate embodiment of the present invention.

To overcome this design shortcoming while maintaining the sealing benefits achieved by placing the seal pin in the seal pin damper slot, an alternate configuration for the seal pin and turbine blade has been determined. Referring now to FIG. 8, a gas turbine blade 800 is shown in elevation view and comprises an axially extending attachment 805, a neck 810 extending radially outward from the attachment 805 and having a forward buttress 815 and an opposing aft buttress 820. Extending radially outward from the neck 810 is a platform 825, where the platform is generally rectangular in shape. Located along a sideface 830 of the platform 825 and extending generally between the forward buttress 815 and aft buttress 820 is a seal pin damper slot 835. The gas turbine blade 800 further comprises a generally radially extending forward axial stop 840 extending through the forward buttress 815 and to the platform 825. That is, the forward axial stop 840 is essentially an upper portion of the forward buttress material that was not removed when the seal pin damper slot 835 is formed. Opposed to the forward axial stop 840 is an aft axial stop 845 also extending through the aft buttress 820 and to the platform 825. Located within the seal pin damper slot 835 and in contact with an adjacent turbine blade (not shown) is a generally cylindrical seal pin 850, similar to the seal pin configuration discussed above.

While the configuration disclosed above provides for a seal pin damper slot having improved manufacturability and repeatability between parts to overcome the shortfalls of the brazed axial pin stop, additional benefits of the present invention can be achieved in terms of reducing the stress level imparted on the buttress, neck and root portions of the turbine blade due to the aerodynamic load of an airfoil 855.

Figure 9:
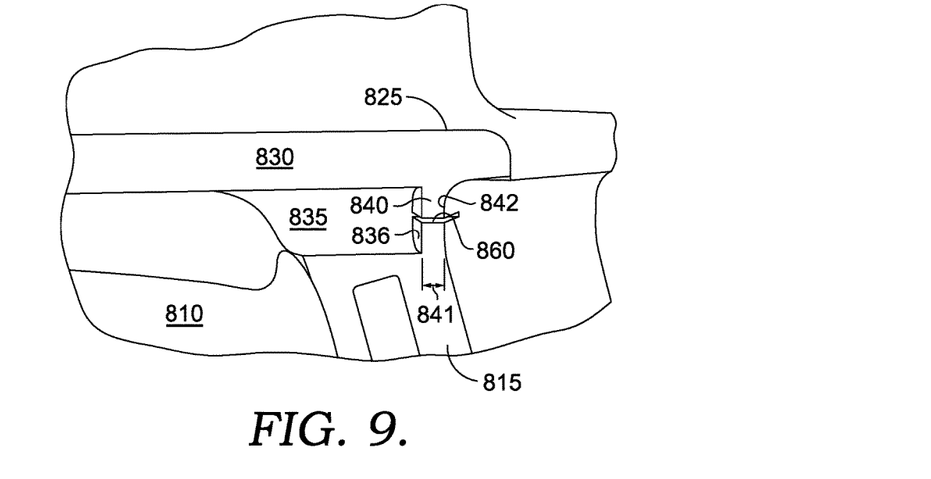
FIG. 9 is a detailed elevation view of a portion of the gas turbine blade of FIG. 8 in accordance with an alternate embodiment of the present invention.
Figure 10:
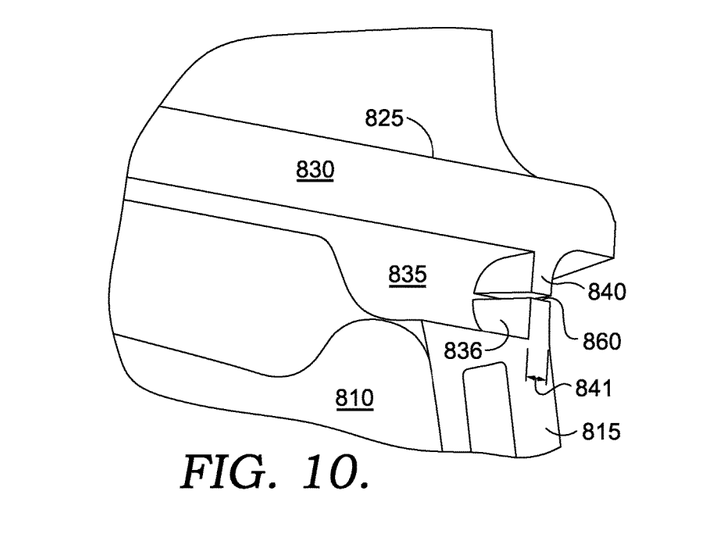
FIG. 10 is a detailed perspective view of a portion of the gas turbine blade incorporating an alternate form of the relief slot in accordance with an alternate embodiment of the present invention.

As discussed above, high stress concentrations can be found in the region between the platform and buttress region of the blade. Referring now to FIGS. 9 and 10, as a result of the forward axial stop geometry, it is possible to include a relief slot 860 in the forward axial stop region, where the relief slot 860 severs the loadpath of the mechanical stresses passing from the airfoil 855 to the forward buttress 815, neck 810 and attachment 805. That is, the relief slot 860 is located where a section of material of the forward axial stop 840 is removed. The material of the forward axial stop 840 can be removed by a variety of machining techniques. As shown in FIGS. 8-10, the relief slot 860 is located proximate a midspan of the forward axial stop 840, adjacent the platform 825. Although a variety of configurations for the relief slot 860 are possible, one such configuration comprises a slot having a width of approximately 0.020 inches wide by approximately 0.260 inches deep, as measured extending into the turbine blade as well as extending through the thickness of the forward axial stop. As a result, the relief slot 860 helps to break the load path through the buttress while also providing a forward axial stop for the generally cylindrical seal pin 850.

Also as seen in FIGS. 9 and 10, the seal pin damper slot 835 may extend between a pin damper slot forward wall 836 and an opposing pin damper slot aft wall (not shown in FIGS. 9 and 10). In accordance with aspects herein, the forward axial stop 840 may have a width 841 extending between a forward axial stop wall 842 and the pin damper slot forward wall 836. The forward axial stop wall 842 generally opposes the pin damper slot forward wall 836 on an opposite side of the width 841 of the forward axial stop 840. Additionally, as shown in FIGS. 9 and 10, the relief slot 860 generally extends between the forward axial stop wall 842 and the pin damper slot forward wall 836.

Figure 14:
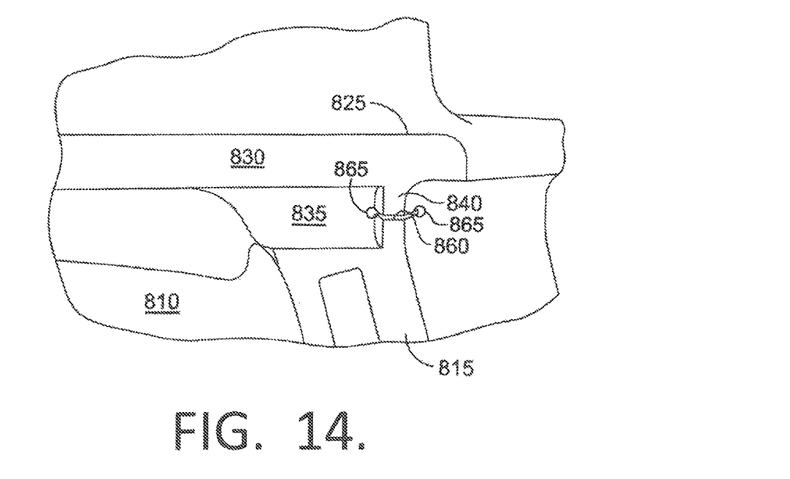
FIG. 14 is an elevation view of a gas turbine blade incorporating the relief slot in accordance with an alternate embodiment of the present invention.
Figure 15:
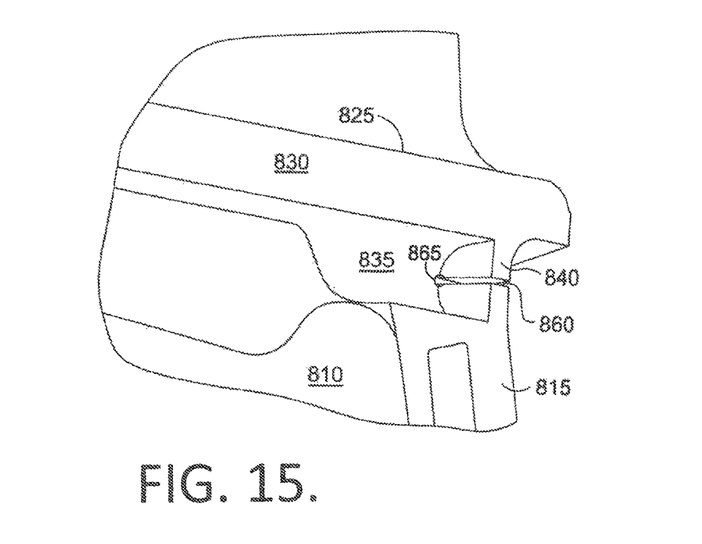
FIG. 15 is a detailed elevation view of a portion of the gas turbine blade of FIG. 8 in accordance with an alternate embodiment of the present invention.
Figure 16:
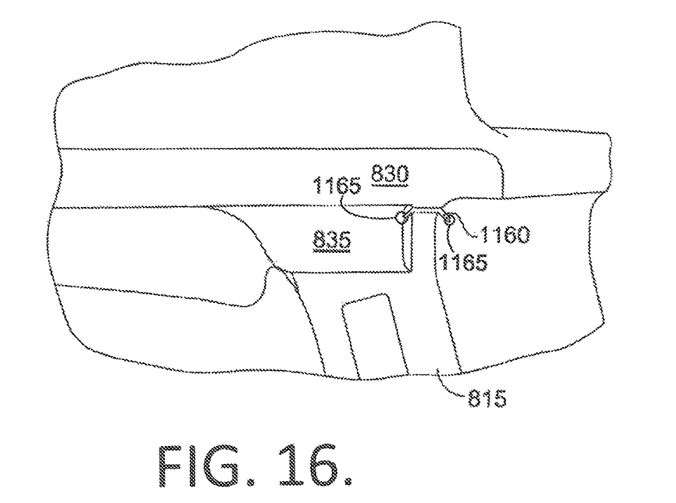
FIG. 16 is a detailed perspective view of a portion of the gas turbine blade incorporating an alternate form of the relief slot in accordance with an alternate embodiment of the present invention.
Figure 17:
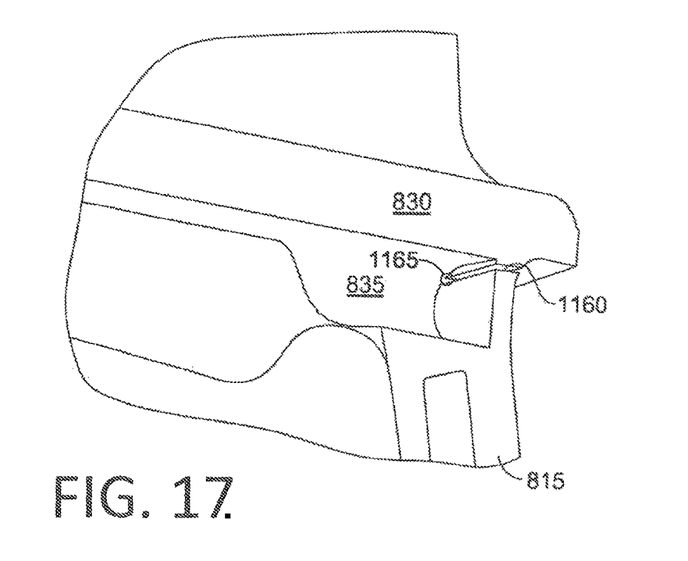
FIG. 17 is a detailed elevation view of a portion of a gas turbine blade in accordance with an alternate embodiment of the present invention.

Depending on the operating conditions, it may be necessary to include a small radius at the end of the relief slot 860 within the turbine blade. Where there are sharp corners, such as that formed by a small slot width, a radius 865 helps to avoid any unwanted stress concentrations at the interface of the relief slot 860 and the forward axial stop 840. Representative radii 865 and 1165 are shown at the end of slot 860 in FIGS. 14 and 15 and at the end of slot 1160 in FIGS. 16 and 17, respectively.

Figure 11:
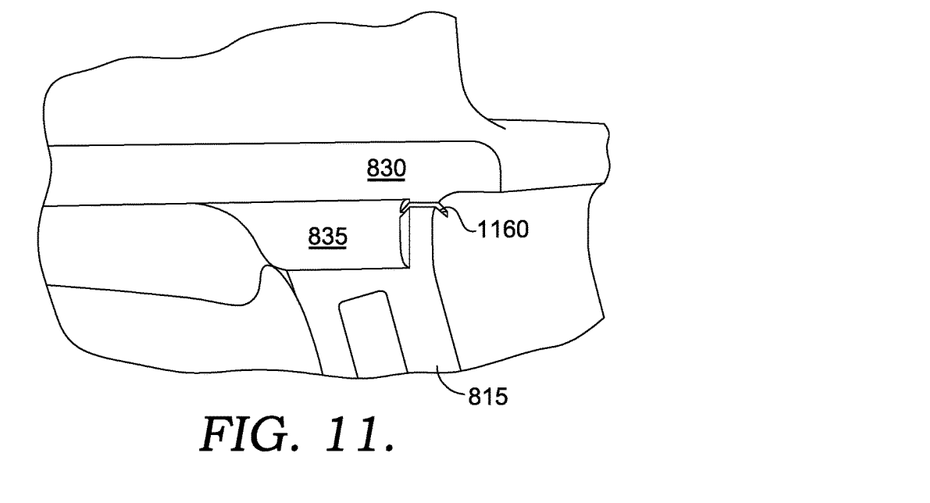
FIG. 11 is a detailed elevation view of a portion of a gas turbine blade in accordance with an alternate embodiment of the present invention.
Figure 12:
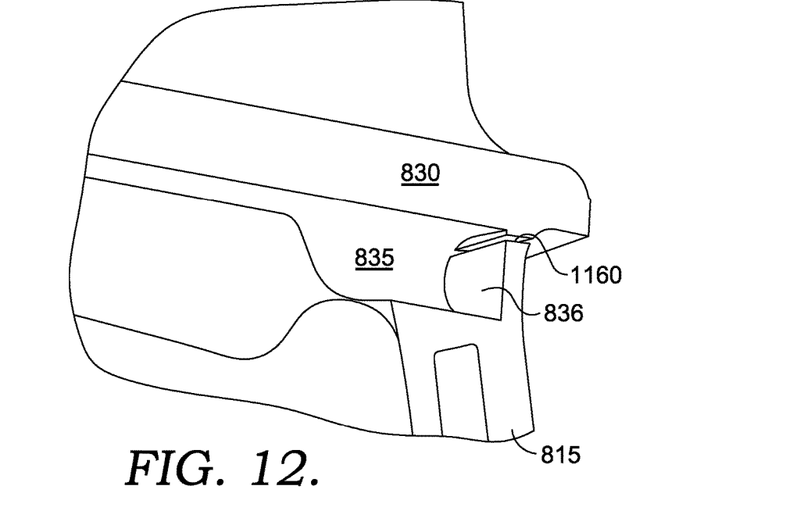
FIG. 12 is a detailed perspective view of the gas turbine blade of FIG. 11 in accordance with an alternate embodiment of the present invention.

In an alternate embodiment of this invention, the relief slot 860 can be located towards a radially outer edge of the forward axial stop 840, adjacent the platform 825. Referring to FIGS. 11 and 12, the turbine blade 800 is shown with an alternate location for relief slot 1160, where the relief slot 1160 is positioned proximate the platform 825. As with relief slot 860 in FIG. 8, the alternate relief slot 1160 can also be machined into the turbine blade by a variety of machining techniques. The relief slot extends a depth into the turbine blade such that it disrupts the loadpath of stresses from the airfoil into the forward buttress region of the turbine blade. Despite the relief slot 1160 being located at the radially outward position in FIGS. 11 and 12, only a small portion of the forward axial stop 840 has been removed, such that the forward axial stop still provides sufficient surface area with which to retain the seal pin in the seal pin damper slot 835.

As discussed above, the seal pin damper slot extends along a majority of an axial length of the platform and is sized such that the seal pin can move axially between the forward axial stop and the aft axial stop. Like prior embodiments of the present invention, the generally cylindrical seal pin is positioned in the seal pin damper slot and sandwiched between adjacent turbine blades so as to prevent gases from entering or exiting a seal pin damper slot.

Figure 13:
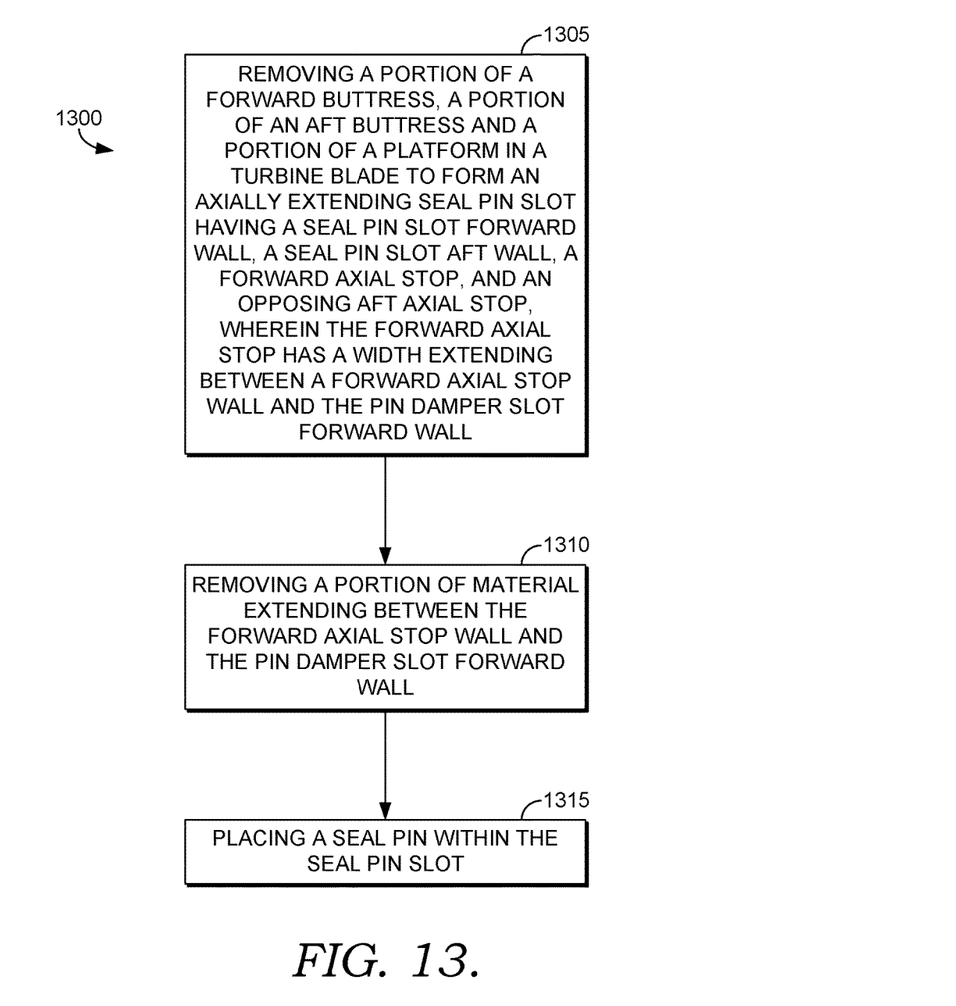
FIG. 13 is a flow diagram depicting a process of sealing platform gaps between adjacent turbine blades in accordance with an alternate embodiment of the present invention.

In an alternate embodiment of the present invention, a method of sealing platform gaps between adjacent turbine blades in a gas turbine engine is disclosed. The method 1300 is outlined in FIG. 13. Referring now to FIG. 13, a portion of the forward buttress, portion of the aft buttress and a portion of the platform is removed in a step 1305 to form an axially extending seal pin slot. The seal pin slot has a forward axial stop and an opposing aft axial stop. In addition to the seal pin slot, the process includes a step 1310 of forming a relief slot in the turbine blade by removing a portion of material adjacent to or in the forward axial stop. Once the slots are machined in the turbine blade, a generally cylindrical seal pin is placed within the seal pin damper slot in a step 1315.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. An axial pin seal assembly for a gas turbine blade comprising:
   a substantially axially extending seal pin damper slot extending a distance between a pin damper slot forward wall buttress and an opposing pin damper slot aft wall buttress and having a forward end and opposing aft end;
   a substantially radially extending forward axial stop located proximate the forward end of the seal pin damper slot, wherein the forward axial stop has a width extending between a forward-most axial stop wall and a forward axial stop wall on the opposite side of the width of the forward axial stop that opposes the pin damper slot forward wall;
   a substantially radially extending aft axial stop located proximate the aft end of the seal pin damper slot;
   a generally cylindrical seal pin positioned within the seal pin damper slot; and
   a relief slot in the forward axial stop, the relief slot extending from the forward-most axial stop wall to the forward axial stop wall on the opposite side of the width of the forward axial stop that opposes the pin damper slot forward wall;
   wherein the forward and aft axial stops limit axial movement of the seal pin.

2. The axial pin seal assembly of claim 1, wherein the relief slot is located at a radially outer portion of the forward axial stop, adjacent a platform of the gas turbine blade.

3. The axial pin seal assembly of claim 1, wherein the relief slot is located proximate a midspan of the forward axial stop and spans the width of the forward axial stop.

4. The axial pin seal assembly of claim 1, wherein the seal pin damper slot is machined into the buttresses and a platform of the gas turbine blade.

5. The axial pin seal assembly of claim 1, wherein the forward axial stop at least partially blocks the seal pin damper slot in order to prevent forward movement of the seal pin.

6. The axial pin seal assembly of claim 1, wherein the relief slot cut extends into the forward axial stop a circumferential depth and an axial length.

7. The axial pin seal assembly of claim 6, wherein the relief slot alters a loadpath on the blade such that mechanical load applied to the airfoil is not transmitted to a root of the blade by way of the forward axial stop.

8. A gas turbine blade assembly comprising:
   an axially extending attachment;
   a neck extending radially outward from the attachment and having a forward buttress and an opposing aft buttress;
   a platform extending radially outward from the neck;
   a seal pin damper slot extending along a sideface of the platform generally between a damper pin slot forward wall the forward buttress and an opposing pin damper slot aft wall buttress;
   a generally radially extending forward axial stop, wherein the forward axial stop has a width extending between a forward-most axial stop wall and a forward axial stop wall on the opposite side of the width of the forward axial stop that opposes the pin damper slot forward wall extending through the forward buttress and to the platform and aft axial stop extending through the aft buttress and to the platform;
   a generally cylindrical seal pin located within the seal pin damper slot;
   a relief slot positioned in the forward axial stop and extending from the forward-most axial stop wall to the forward axial stop wall on the opposite side of the width of the forward axial stop that opposes the pin damper slot forward wall; and,
   an airfoil extending radially outward from the platform.

9. The gas turbine blade assembly of claim 8, wherein the relief slot is positioned proximate a midspan location of the forward axial stop.

10. The gas turbine blade assembly of claim 8, wherein the relief slot is positioned at a radially outward portion of the forward axial stop, proximate the platform.

11. The gas turbine blade assembly of claim 8, wherein the relief slot separates a loadpath between the airfoil and the forward buttress.

12. The gas turbine blade assembly of claim 8, wherein the seal pin damper slot extends along a majority of an axial length of the platform.

13. The gas turbine blade assembly of claim 12, wherein the seal pin generally blocks gases from entering or exiting the seal pin damper slot.

14. The gas turbine blade assembly of claim 8, wherein the generally cylindrical seal pin is also retained by an adjacent turbine blade.

15. The gas turbine assembly of claim 8, wherein the seal pin can move axially between the forward axial stop and the aft axial stop.

16. A method of sealing platform gaps between adjacent turbine blades in a gas turbine engine, comprising:

> removing a portion of a forward buttress, a portion of an aft buttress and a portion of a platform in a turbine blade to form an axially extending seal pin slot having a seal pin slot forward wall, a seal pin slot aft wall, a forward axial stop, and an opposing aft axial stop, wherein the forward axial stop has a width extending between a forward-most axial stop wall and a forward axial stop wall on the opposite side of the width of the forward axial stop that opposes the pin damper slot forward wall;
>
> forming a relief slot in the turbine blade by removing a portion of material adjacent to or in extending from the forward-most axial stop wall to the forward axial stop wall on the opposite side of the width of the forward axial stop that opposes the pin damper slot forward wall; and,
>
> placing a generally cylindrical seal pin within the seal pin damper slot.

17. The method of claim 16, wherein the seal pin damper slot and relief slot are machined into a cast turbine blade.

18. The method of claim 16, wherein the portion of the material removed to form the relief slot is along a pressure side of the blade.

19. The method of claim 16, wherein the relief slot breaks a loadpath between an airfoil of the turbine blade and a root portion of the blade.

20. The method of claim 16, wherein the seal pin can move axially within the seal pin damper slot.

\* \* \* \* \*